(12) United States Patent
Herrington

(10) Patent No.: US 11,439,930 B1
(45) Date of Patent: Sep. 13, 2022

(54) COVER FOR FUEL FILTER

(71) Applicant: Bryce Herrington, S. Beloit, IL (US)

(72) Inventor: Bryce Herrington, S. Beloit, IL (US)

( * ) Notice: Subject to any disclaimer, the term of this patent is extended or adjusted under 35 U.S.C. 154(b) by 7 days.

(21) Appl. No.: 17/005,502

(22) Filed: Aug. 28, 2020

(51) Int. Cl.
 *B01D 27/08* (2006.01)
 *B01D 35/18* (2006.01)
 *F02M 37/32* (2019.01)

(52) U.S. Cl.
 CPC .............. *B01D 27/08* (2013.01); *B01D 35/18* (2013.01); *F02M 37/32* (2019.01)

(58) Field of Classification Search
 CPC ......... B01D 27/08; B01D 35/18; F02M 37/32
 See application file for complete search history.

(56) References Cited

U.S. PATENT DOCUMENTS

| | | | |
|---|---|---|---|
| 4,091,265 A | 5/1978 | Richards | |
| 4,854,736 A * | 8/1989 | McVeigh | A45C 3/04 383/76 |
| 5,003,941 A | 4/1991 | Jeffrey | |
| 5,005,374 A * | 4/1991 | Spitler | A41D 13/0055 2/171.2 |
| 5,244,571 A | 9/1993 | Church | |
| 5,595,069 A * | 1/1997 | Gies | B65D 81/3883 62/530 |
| 5,931,583 A * | 8/1999 | Collie | A45C 13/10 383/89 |
| 6,990,966 B2 | 1/2006 | Watanabe | |
| 2008/0179239 A1 * | 7/2008 | Huelskamp | C02F 1/003 210/435 |
| 2014/0231441 A1 * | 8/2014 | Bollis | B65D 81/3876 220/737 |

* cited by examiner

*Primary Examiner* — Waqaas Ali
(74) *Attorney, Agent, or Firm* — Sanchelima & Associates, P.A.; Christian Sanchelima; Jesus Sanchelima

(57) ABSTRACT

A system for cover for fuel filters that includes a flexible cylindrical sheet member is disclosed. The sheet member includes a top wall at a first end and a second end that is open. The cylindrical sheet member snugly receives the fuel filter being protected. The sheet member is made out of thermal insulating material such as neoprene. To further conform the open end to the outer shape of the diesel fuel filter, a strap member with pressure sensitive hook and loop fasteners is used.

1 Claim, 2 Drawing Sheets

COVER FOR FUEL FILTER

BACKGROUND OF THE INVENTION

1. Field of the Invention

The present invention relates to a fuel filter cover or sleeve and, more particularly, to a fuel filter cover that insulates, typically overnight.

2. Description of the Related Art

Several designs for insulators have been created in the past. Fuel additives, heaters or water separators are often used to avoid clogging of the vehicle's diesel filter during cold winters. None of them, however, include a reusable, durable, wind resistant and waterproof insulation sleeve to avoid fuel filter clogging. Fuel filters are placed in trucks and heavy equipment to cleanse the diesel fuel of rust and debris. The lack of a functional fuel filter or a clogged fuel filter may result in engine power malfunction, misfires, or stalling. In colder climates, a paraffin wax crystal formation, or "gelling", is a common issue in diesel engine and their fuel filters. At present day, in order to avoid gelling of a diesel fuel filter, the vehicle must be parked in a warm area. In colder conditions, the vehicle must be replenished more often with fresh diesel, additives, or elusive winterized diesel fuel. An alternative is an engine block heater that must be fitted to the vehicle by a dealership. The existing solutions become delaying obstacles, specifically for long haul drivers in cold climates where these solutions may not be instantly accessible and expensive.

Applicant believes that a related reference corresponds to U.S. Pat. No. 5,244,571 for a fuel filter assembly with heater. The cited disclosure comprises a fuel filter assembly for filtering diesel fuel includes a filter head, a spin on replaceable element and a collection bowl removable from the edge portion at a lower end. An adapter ring is supported on said edge portion inside the element and includes an annular threaded portion. The collection bowl has an outer peripheral wall with an annular threaded portion engaging the threaded portion of the adapter ring. The outer peripheral wall of the bowl has an annular shoulder abutting the turned-in edge portion of said casing to clamp said casing between the adapter ring and the bowl, when the bowl is attached to the element. A seal between the shoulder and the casing further serves to hold the element and the bowl in fluid tight relation.

Another related reference corresponds to U.S. Pat. No. 4,091,265 for a fuel filter heating assembly. The cited disclosure comprises a solid-state fuel heater unit for use in heating the fuel flow in a fuel filter is disclosed which unit includes a heat conducting ring having a power transistor mounted thereon and driving a power resistor mounted there within. Circuitry for controlling the operation of the power transistor, including a thermistor, is mounted within the ring by means of component sealant or potting material which isolates the thermistor from direct transfer of heat thereto from the power transistor and power resistor. The heater unit is adapted to be immersed in the flow of fuel in a fuel filter with the axis of the ring substantially parallel to the fuel flow through the filter.

Applicant believes yet another related reference corresponds to U.S. Pat. No. 6,990,966 B2 disclosing a heater unit for a combustion-stabilizing device and a combustion stabilizing device including the same. The cited disclosure comprises a slit-shaped heater holder outside the heat-exchanger tube can eliminate the use of adhesive in the heater assembly. A flat electrode which is pressed on and in surface contact with the PTC heater can improve the wear resistance of the heater contact, prevent the PTC heater breaker, and even assure the electrical connecting to the broken PTC heater.

Another reference relates to U.S. Pat. No. 5,003,941, which discloses an engine heating unit. The cited disclosure comprises a liquified gas fired system that facilitates starting of an internal combustion engine by external heating of the engine coolant and fuel so as to allow periodic shut down in cold weather. The system includes an engine coolant heat exchanger inside a refractory lined fire-box which is heated to incandescent temperatures. Both engine coolant and liquified gas are preheated by regenerative cooling of the combustion products and an auxiliary gas heater is provided for unassisted cold starting of the system However, none of the related art teaches of a reusable insulated sleeve design to keep the heat in a diesel filter for a predetermined time period. Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a fuel filter cover that insulates.

It is another object of this invention to provide a fuel filter cover that is removable.

It is still another object of the present invention to provide a fuel filter cover that is reusable.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
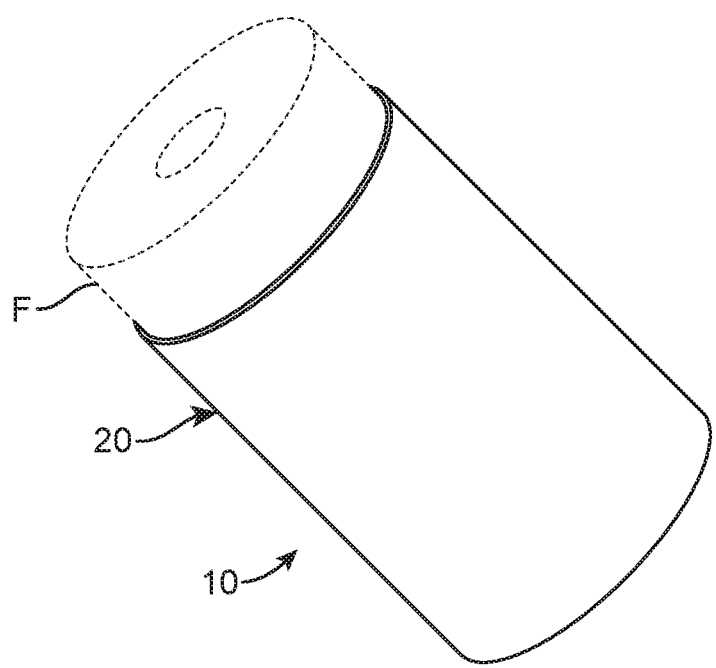
FIG. 1 represents an operational view showing cover 10 receiving a fuel filter F therein.

Referring now to the drawings, where the present invention is generally referred to with numeral 10, it can be observed that it basically includes an elongated cylindrical sheet member 20 made out of a thermal insulating material.

A cover 10, as best seen in FIG. 1, is used to receive a fuel filter F within. Preferably, fuel filter F may be a diesel fuel filter. Fuel filters are placed in trucks and heavy equipment to cleanse the diesel fuel of rust and debris from the engine of a vehicle. Without a functional fuel filter or a clogged fuel filter may result in engine power malfunction, misfires, or stalling rendering the vehicle inoperable. In colder climates, gelling is a common issue occurring in diesel engines and their fuel filters. Gelling prevents the fuel to flow through the engine and fuel filter F, thereby preventing proper function of the engine. To avoid gelling of fuel filter F, warmth must be provided to fuel filter F. Cover 10 prevents heat from escaping for as long as possible to avoid the gelling of the fuel inside fuel filter F when the ambient temperature is low and the vehicle is idle for a period of time. The present invention maintains the temperature inside of fuel filter F sufficiently high to avoid fuel gelling overnight. Cover 10 provides the needed warmth to fuel filter F to allow proper function to continue.

Figure 2:
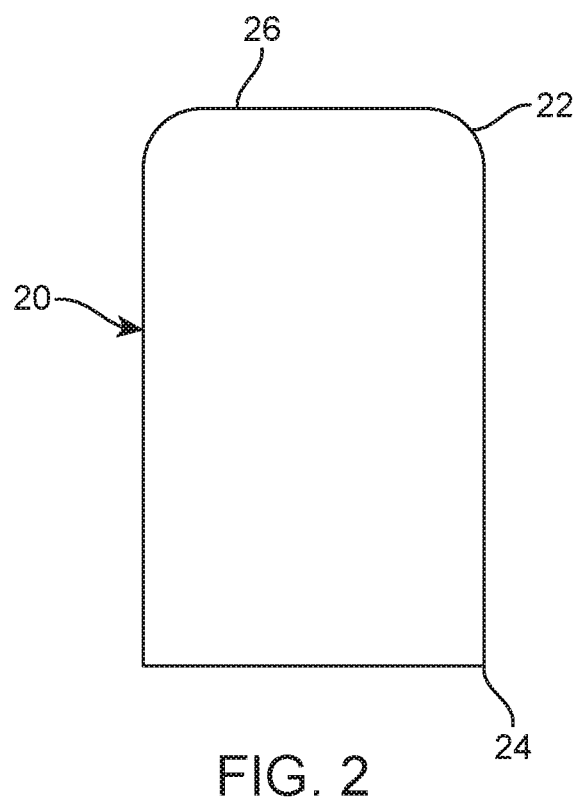
FIG. 2 shows a side view of cover 10 for fuel filter F.
Figure 3:
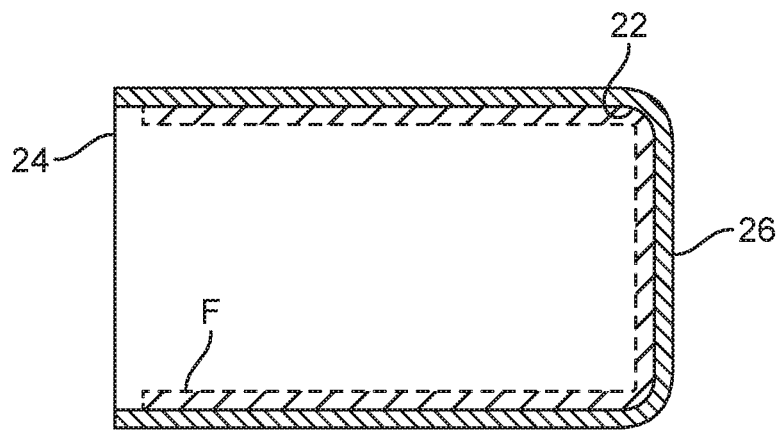
FIG. 3 shows a cross-sectional view of fuel filter F within cover 10.
Figure 4:
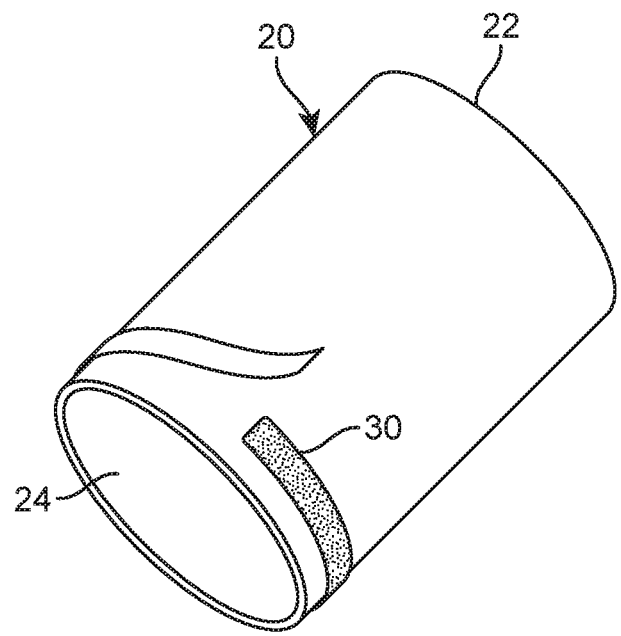
FIG. 4 illustrates an inclined isometric view of cover 10.

As best seen in FIGS. 1-4, cover 10 is seen depicted. It is to be understood that cover 10 includes a sheet member 20. Sheet member 20 may be made of materials such as neoprene. Additionally, sheet member 20 may be waterproof and wind proof. Preferably, sheet member 20 may have an elongated cylindrical shape. Sheet member 20 may preferably having a length greater than a width thereof. Sheet member 20 has first end 22 and second end 24. First end 22 is covered with a top wall 26. First end 22 may preferably be domed or rounded. Second end 24 is preferably open and round. Sheet member 20 cooperatively and snugly receives fuel filter F to be protected. As best seen in FIG. 2, sheet member 20 partially covers fuel filter F when fuel filter F is received within sheet member 20. Fuel filter F may extend outwardly from sheet member 20 through second end 24. Sheet member 20 may conform to fuel filter F as it is made of a flexible material. As best seen in FIG. 3, it can be seen that fuel filter F may be substantially in constant abutting contact with the interior of sheet member 20.

Preferably, sheet member 20 and top wall 26 are made of a thermally insulating material. Second end 24 conforms to the outer dimensions of fuel filter F to be protected. In one of the preferred embodiments, a strap member 30 is used to further secure cover 10 to fuel filter F being protected. Strap member 30 is implemented, in one of the preferred embodiments, with pressure sensitive hook and loop fasteners. Other means for conforming second end 24 to the contour of the protected fuel filter F may also be suitable. It can be seen that strap member 30 extends about the perimeter of sheet member 20 between first end 22 and second end 24. Strap member 30 may be in constant abutting contact with sheet member 20. Strap member 30 may preferably be adjacent and nearest to second end 24.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A cover for a fuel system, consisting of:
    a) a fuel filter configured to be attached to internal combustion engines, when operating the fuel filter heats up;
    b) an elongated cylindrical sheet member having a first end and a second end, said first end being closed with a top wall and said second end being open, said top wall being domed, said cylindrical sheet member receives a fuel filter therein through said second end, said cylindrical sheet member partially covering said fuel filter, said cylindrical sheet member and said top wall made of a thermal insulating material, said thermal insulating material is neoprene, said fuel filter being in constant abutting contact with the entire of said cylindrical sheet member, said cylindrical sheet member being flexible to conform with the shape of said fuel filter, said sheet member being waterproof and wind resistant, said sheet member and said top wall being made of said thermal insulating material prevent heat coming out of the fuel filter when operating from dispel, a strap member secured to said cylindrical sheet member about an entire perimeter thereof, said strap member being hook and loop straps, said strap member is proximal to said second end.

* * * * *